_United States Patent Office_ 3,288,731
Patented Nov. 29, 1966

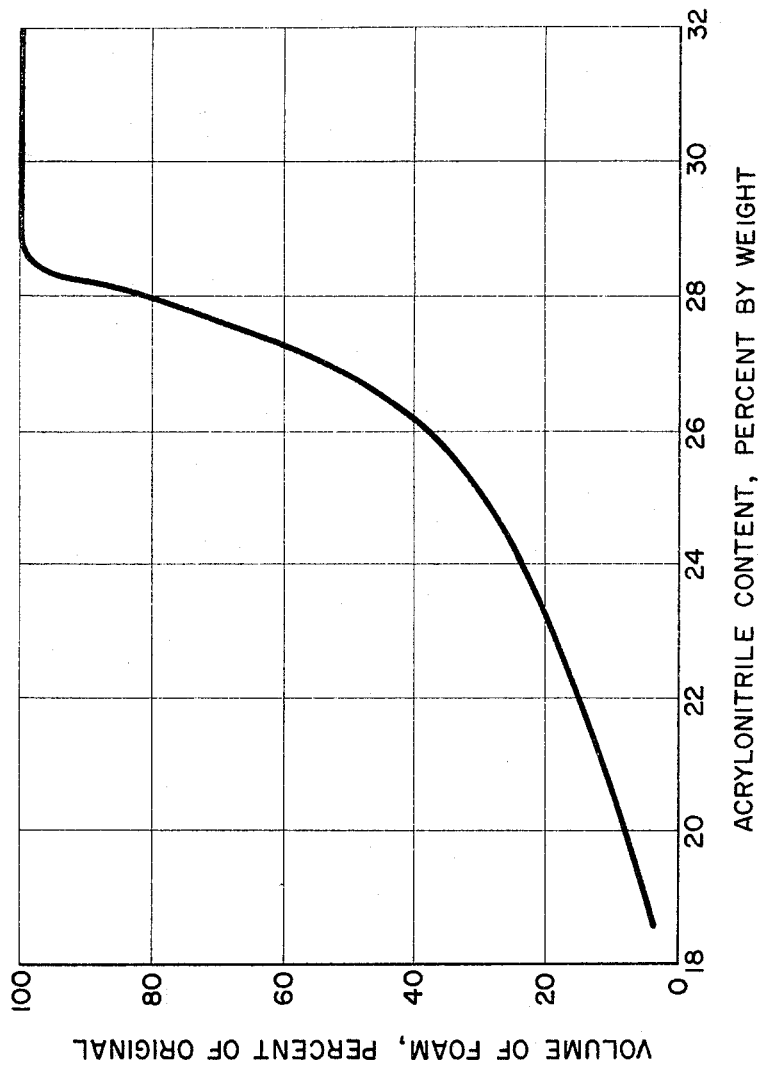

3,288,731
METHOD FOR IMPROVING THE PROPERTIES OF POLYMERS CONTAINING ACRYLONITRILE
Alvin R. Ingram, Murrysville, and Edward H. Gleason, Monroeville, Pa., assignors to Koppers Company, Inc., a corporation of Delaware
Filed Sept. 24, 1963, Ser. No. 311,091
9 Claims. (Cl. 260—2.5)

This invention relates to a method of improving the properties of multipolymers of vinyl aryl monomers and acrylonitrile. In one specific aspect, it relates to a method of making aromatic-solvent-resistant foams from styrene and acrylonitrile.

Polystyrene foam has many important commercial applications in the fields of insulation, packaging, and buoyant materials. The use of polystyrene is limited in the fields of buoyancy or in packaging lubricated materials since polystyrene foam is not resistant to aromatic solvents. When polystyrene foam is used for marine floats or small boats, slicks of aromatic gasolines formed on the surface of the water by passing motor boats tend to collapse the foam cells. In packaging lubricated materials, the lubricants employed to protect metallic parts against corrosion tend to destroy the polystyrene foam. In view of the increasing importance of foamed material having solvent resistant properties, a polymeric material of vinyl aryl monomers and acrylonitrile was developed.

The incorporation of acrylonitrile, while solving the problem of solvent resistance, unfortunately created certain other difficulties. Unreacted acrylonitrile, which is highly toxic, had to be removed from the polymer and from the effluents. Further, when sufficient quantities of acrylonitrile were incorporated in the polymer, the product was discolored and had an unpleasant odor. Heretofore, it was proposed to add a blue dye to this polymer. While this masks the discoloration, it does not eliminate the real difficulties.

It is therefore an object of the present invention to provide a method of making aromatic solvent-resistant polymeric beads from vinyl aryl monomers and acrylonitrile which are substantially free of residual acrylonitrile and discoloration.

In accordance with the present invention, we have discovered a method of making acrylonitrile-containing polymeric beads which are substantially free of residual acrylonitrile and discoloration. This method involves polymerizing to about the bead identity point at a temperature of 65–100° C., a monomeric mixture comprising 60–75 percent by weight of vinyl aryl monomers and 25–40 percent by weight of acrylonitrile in an aqueous suspension in the presence of a catalytic amount of a free-radical initiator, adding a base selected from the group consisting of alkali metal hydroxides and oxides, alkaline earth metal hydroxides and oxides wherein said alkaline earth metal has an atomic number of 20–56 inclusive, tetraalkyl quaternary ammonium compounds wherein said alkyl group is a member selected from the group consisting of methyl, ethyl, and n-propyl, and alkali metal salts of weak acids having a pH of at least 12.0, the base being added in an amount sufficient to maintain the beads in a colorless condition. Thereafter the polymerization is completed and the polymeric beads are recovered.

For the purpose of definition, the terms "aromatic solvent resistant polymeric beads" and "aromatic solvent resistant expandable polymeric beads" as used herein mean polymeric beads which do not tend to shrink, collapse, absorb solvent, or dissolve. The term "bead identity point" as used herein means the point during suspension polymerization at which the beads have grown to their ultimate size. This latter term is based on the well-known fact that during suspension polymerization in a turbulently-stirred reactor, there is a continuous increase in size of the polymerizing monomer droplets until they reach a certain size and become sufficiently hard or have sufficient repellency so that the droplets no longer coalesce and grow. The term "beads" as used herein means particles formed during suspension polymerization which are usually spherical in shape and also includes particles in which the spherical shape has been distorted, such as disc, lenticular, and ovate spheroid shaped particles.

The acrylonitrile content of the product polymer required to provide solvent resistance to highly aromatic gasoline is better understood with reference to the following drawing.

The drawing shows a graphic representation of the resistance of styrene-acrylonitrile foams to aromatic gasoline.

From this figure of the drawing, it will be apparent that as the percent by weight of acrylonitrile of the styrene-acrylonitrile foam increases from 25 to 28 percent, the aromatic gasoline resistance, as based on the percent of original foam, increases sharply; when the acrylonitrile content is greater than about 28.5 percent, the styrene-acrylonitrile foam is completely resistant to the aromatic gasoline. The data for the figure is based on tests of expandable styrene-acrylonitrile beads, which were heated in a steam atmosphere for ten minutes, and the bulk density was determined after aging the particles overnight. A wide-mouthed, four-ounce jar full of "10 minute" pre-expanded beads was then filled with aromatic gasoline (unleaded Amoco, having a "Kauri-butanol Value" of 54 and an "Aniline Cloud Point" of 17° C.) and sealed with a screw cap. The height of the floating pre-expanded beads was measured originally and after standing for seven days. The percent of original volume was calculated from the ratio of the two heights.

Further tests were performed to determine resistance of styrene-acrylonitrile foams to a simulated aromatic gasoline composed of 30 percent by volume toluene and 70 percent by volume iso-octane. In this test, 1.0 gram of the dry pre-expanded beads was placed in a wide-mouthed, four-ounce jar together with 50 ml. of the toluene-iso-octane mixture and allowed to stand with occasional agitation for a period of two days. The pre-expanded beads were then removed from the solution and then allowed to dry on a paper towel for one day and the volume of the water displaced thereby was measured. The ratio of the final volume to the original volume of pre-expanded beads was recorded as the percent of original volume. Resistance of the beads to the toluene-iso-octane mixture was similar to that of the aromatic gasoline as shown in the figure.

In order to prepare a polymer having an acrylonitrile content approximated by the drawing, it is necessary to polymerize with about 20–40 percent by weight acrylonitrile in the polymerizing mixture. It is understood that the final amount of acrylonitrile in the polymer is less than the amount of acrylonitrile in the original polymerizing mixture. For highly aromatic solvents, such as a mixture of 30 percent by volume toluene and 70 percent by volume iso-octane, the amount of acrylonitrile in the polymerizing mixture should be preferably 30–40 percent by weight. On the other hand, a minimum of 25 percent by weight of acrylonitrile is adequate for less aromatic solvents.

The solvent-resistant polymeric beads are prepared from a monomeric mixture containing vinyl aryl monomers in an amount of about 60–75 percent by weight.

Vinyl aryl monomers useful in the present invention include styrene; substituted styrenes, such as o-methylstyrene, m-methylstyrene, p-methylstyrene, ethylstyrene, dimethylstyrene, alpha-methylstyrene, p-methoxystyrene, p-chlorostyrene, 2,4-dichlorostyrene, 2,5-dichlorostyrene, p-bromostyrene, alpha - methyl - p - methylstyrene, p-isopropylstyrene; vinyl naphthalene; acenaphthalene; and the like. Mixtures of two or more such compounds may be particularly useful, e.g., styrene and alpha-methylstyrene. It is understood that the percent of acrylonitrile monomer in the polymerizing mixture is of primary importance and that other vinyl monomers, such as acrylates, may be substituted for a minor portion of the vinyl aryl monomer.

Suitable bases include alkali metal hydroxides or oxides, e.g., sodium, potassium, and lithium hydroxides or oxides; alkaline earth metal hydroxides or oxides, e.g., calcium, strontium, and barium hydroxides or oxides; tetraalkyl quaternary ammonium compounds, e.g., tetramethylammonium hydroxide, tetraethylammonium hydroxide, and tetra-n-propylammonium hydroxide; and the alkali metal salts of weak acids having a pK of at least 12.0, e.g., trisodium phosphate, sodium aluminate, and sodium m-silicate. It is understood that the alkali metal oxides and alkaline earth metal oxides are included with the corresponding hydroxides, since these oxides are converted to the hydroxides in aqueous media.

The method of our invention involves the suspension polymerization system. In suspension polymerization the vinyl aryl monomers, acrylonitrile, and the free-radical initiator, in the form of an oil phase, are admixed with water and a minor portion of a stabilizing or suspending agent, such as the finely divided inorganic solids (e.g., tricalcium phosphate) or the protective colloids (e.g., polyvinyl alcohol, hydroxymethyl cellulose, etc.).

The polymerization may be initiated by typical freeradical initiators, such as ultraviolet light, heat, or oilsoluble free-radical catalyst, e.g., benzoyl peroxide, lauroyl peroxide and azobisisobutyronitrile.

The low boiling hydrocarbon blowing agents useful in the present invention include butane, pentane, hexane and isomers thereof. These may be used alone or in mixtures.

The temperature for the polymerization must be high enough so that the polymerization occurs at a reasonable rate and to decompose the free radical initiator, but the temperature should be controlled to prevent excessive hydrolysis of the acrylonitrile prior to the bead identity point. The preferred temperature is between 65–100° C. It is generally preferred to perform the polymerization under autogenous pressure or slightly elevated pressure by the addition of an inert gas, such as nitrogen.

The light colored particles prepared according to the present invention are achieved by controlled time of reagent addition and by controlled amount of reagent addition. It is necessary to add the base at about the bead identity point, which is defined above. In the polymerization of expandable beads in the presence of pentane, the bead identity point corresponds to about a 75–85 percent conversion. If the base is added too early, an excessive amount of acrylonitrile is destroyed, along with some of the initiator, as evidenced by the incomplete polymerization of the vinyl aryl monomer. When the base is added too late, discoloration has already occurred and while its progress may be decreased, the discoloration cannot be removed.

The quantity of base required in our invention must be in an amount sufficient to maintain the beads in a colorless condition. This quantity may be approximated on the basis of 0.03–0.15 gram mole of base per 100 grams of acrylonitrile. Insufficient amounts of base will not prevent discoloration, whereas using more than the maximum may interfere with the polymerization.

Our invention is further illustrated by the following examples.

EXAMPLE I

Expandable styrene-acrylonitrile copolymer beads were prepared by suspension polymerization using the following formulation:

| Formulation: | Parts |
|---|---|
| Styrene | 65 |
| Acrylonitrile | 35 |
| Azobisisobutyronitrile | 0.6 |
| n-Pentane | 10.0 |
| Water | 300 |
| Tricalcium phosphate | 4.5 |
| Alkylphenyl polyoxyethylene ether | 0.08 |
| Sodium hydroxide | 0.6 |

To an unheated 100-gallon stainless steel Pfaudler kettle were added the following materials in the order listed: 609 pounds of water; 9.1 pounds of tricalcium phosphate powder; and 74 grams of surfactant. With the charge temperature at 25° C. and the agitator turned off, there were added 132 pounds of styrene, 71 pounds of acrylonitrile, and 553 grams af azobisisobutyronitrile. The agitator was turned on at a speed of 80 r.p.m., the reactor was closed, and 20.5 pounds of technical grade n-pentane was added by a mechanical pump. The reactor was heated at a rate such that 75° C. was reached in 90 minutes. When the ascending temperature reached 60° C., the agitation speed was increased to 115 r.p.m. The temperature was maintained at 75° C. by adding cooling water to the jacket to remove the exothermic heat and then the jacket was thermostatically heated when the exotherm subsided.

After polymerizing for 96 minutes at 75° C. a solution of 553 grams of sodium hydroxide in 5 liters of water was added by the mechanical pump. Heating was continued for a total time of 240 minutes at 75° C. The temperature was then raised to 85° C. in a 30-minute interval and held at 85° C. for 60 minutes. The reactor was then cooled to 30° C. and the agitator turned off.

The suspension was allowed to settle for a few minutes, permitting the beads to float to the surface and the calcium phosphate to settle on the bottom, from which it was drained off. The draining was continued until the bead layer reached the bottom of the reactor and 50 gallons of water was added. The slurry was transferred to a separate kettle, and the pH was adjusted to 1.8 with hydrochloric acid. The beads were separated from the water phase in a basket centrifuge and then were rinsed until the pH of the wash water was at least 5.9. The damp beads were dried to free flowing at 35° C. in a continuous cocurrent of warm air in a "Bartlett-Snow" dryer.

The expandable beads were spherical in shape and white in color and had the following characteristics:

| | |
|---|---|
| Total volatiles at 150° C., percent | 9.0 |
| Moisture, percent | 0.6 |
| Intrinsic viscosity in dimethyl formamide at 30° C. | 1.23 |
| Combined acrylonitrile, percent | 28.7 |
| Residual monomers: | |
|   Styrene, percent | 0.1 |
|   Acrylonitrile, percent | 0.1 |
| Shrinkage in aromatic gasoline | Nil |

EXAMPLE II

Following the procedure of Example I, expandable styrene - acrylonitrile - alpha - methylstyrene terpolymer beads were prepared using the following formulation:

| Formulation: | Parts |
|---|---|
| Styrene | 55 |
| Acrylonitrile | 35 |
| Alpha-methylstyrene | 10 |
| Lauroyl peroxide | 0.8 |
| Benzoyl peroxide | 0.2 |
| Water | 182 |
| Tricalcium phosphate | 3.0 |

Table—Continued

| Formulation: | Parts |
|---|---|
| Alkylphenyl polyoxyethylene ether | 0.06 |
| n-Pentane | 10.0 |
| Sodium hydroxide | 1.1 |

The expandable beads were spherical in shape and white in color and had the following characteristics:

| | |
|---|---|
| Total volatiles at 150° C., percent | 9.3 |
| Moisture, percent | 0.3 |
| Intrinsic viscosity in dimethyl formamide at 30° C. | 1.25 |
| Combined acrylonitrile, percent | 29.2 |
| Residual monomers: | |
| Styrene, percent | 0.4 |
| Alpha-methylstyrene, percent | 0.3 |
| Acrylonitrile, percent | <0.1 |
| Shrinkage in aromatic gasoline | Nil |

The heating cycle of Example I was followed, with the exception that the temperature was maintained at 75° C. for 270 minutes, raised to 85° C. over an interval of 60 minutes and finally maintained at 85° C. for 30 minutes. The sodium hydroxide was added after 210 minutes at 75° C.

EXAMPLE III

To two 12-ounce bottles were charged a water phase containing 150 ml. of water, 2 g. tricalcium phosphate, 0.04 g. of non-ionic surfactant; and then an oil phase containing 27.5 g. of styrene, 17.5 g. acrylonitrile, 5 g. alpha-methylstyrene, 0.04 g. lauroyl peroxide, 0.1 g. benzoyl peroxide and 6.6 g. n-pentane. The bottles were sealed with oil-resistant rubber liners and placed in a heated oil bath for 5 hours at 75° C. during which time the bottles were agitated by rotating end over end. Then, to one sample, a solution of 1.0 g. of sodium hydroxide in water was injected. The polymerization was continued for an additional three hours at 85° C. It was determined that the residual acrylonitrile in the beads of the standard was 0.9 percent by weight whereas the beads to which caustic had been added contained less than 0.1 percent. The polymer beads from the caustic addition process were observed to be much less colored and retained a relative color advantage upon heating when compared to the standard polymer beads. It was also found that beads of less color were more soluble in chloroform whereas the standard beads while remaining discrete swelled considerably.

EXAMPLE IV

Following the procedure of Example III, 12-ounce bottles were charged with a water phase containing 150 ml. of water, 2 grams tricalcium phosphate, 0.04 gram non-ionic surfactant; and then charged with an oil phase containing 32.5 grams styrene, 17.5 grams acrylonitrile, 0.3 gram azobisisobutyronitrile and 6.2 grams n-pentane. The monomers were polymerized for a total of four hours at 75° C., then heated over an interval of 0.5 hour to 85° C., and finally heated for three hours at 85° C.

Various reagents were added to the bottles at 1.5–1.6 hours at 75° C. by syringe through the oil-resistant cap liner, while the agitation was temporarily stopped. Liquid reagents were added directly; solid agents were added as solutions or dispersions in about 5 ml. of water. The monomer-to-polymer conversion at the time of injection was about 75–85 percent. The evaluation of the reagents for preparing light colored expandable beads is shown in Table I below.

The results indicate that the addition of alkali metal hydroxides at about 75–85 percent conversion produced white beads which were soluble in chloroform and contained not more than 0.1 percent residual acrylonitrile as compared to the untreated control which gave yellow beads, insoluble in chloroform and contained 0.6 percent residual acrylonitrile.

EXAMPLE V

Following the procedure of Example IV, quaternary ammonium hydroxide was substituted as the reagent, with the results shown in Table I below.

The results indicate that tetraethylammonium hydroxide was about equally effective as the alkali metal hydroxides in producing white beads which were soluble in chloroform and contained not more than 0.1 percent residual acrylonitrile.

EXAMPLE VI

Following the procedure of Example IV, hydroxides of multivalent metals were substituted as the reagents, with the results shown in Table I below.

The results indicate that the hydroxides of calcium (atomic number 20) and barium (atomic number 56) considerably reduced the discoloration and residual acrylonitrile content of the beads; whereas magnesium oxide and aluminum hydroxide showed no significant effect.

EXAMPLE VII

Following the procedure of Example IV, basic salts were substituted as the reagents, with the results shown in Table I below.

The results indicate that the alkali metal salts of weak acids having a pK of at least 12.0, e.g., sodium aluminate, sodium metasilicate, and trisodium phosphate, considerably reduced the discoloration and residual acrylonitrile content of the beads; whereas the alkali metal salts of weaks acids having a pK of less than 12 showed no significant effect.

EXAMPLE VIII

Following the procedure of Example IV, ammonia and amines were substituted as the reagents, with the results shown in Table I below.

The results indicate that ammonia and amines had no significant effect in reducing the discoloration and residual acrylonitrile content of the beads.

EXAMPLE IX

Following the procedure of Example IV, acids were substituted as the reagent, with the results shown in Table I below.

The results indicate that acids had no significant effect in reducing the discoloration and residual acrylonitrile content of the beads.

EXAMPLE X

Following the procedure of Example IV, water-soluble peroxides were substituted as the reagent, with the results shown in Table I below.

The results indicate that water-soluble peroxides had no significant effect in reducing the discoloration and residual acrylonitrile content of the beads.

EXAMPLE XI

Following the procedure of Example IV, oxidizing agents were substituted as the reagent, with the results shown in Table I below.

The results indicate that oxidizing agents had no significant effect in reducing the discoloration or residual acrylonitrile content of the beads.

EXAMPLE XII

Following the procedure of Example IV, various other reagents were substituted, with the results shown in Table I below.

The results indicate that none of the reagents used in this example had any significant effect in reducing the discoloration or residual acrylonitrile content of the beads.

Table 1

AN EVALUATION OF REAGENTS FOR PREPARING LIGHT-COLORED EXPANDABLE BEADS FROM A SOLUTION COMPRISING 65 PARTS OF STYRENE, 35 PARTS OF ACRYLONITRILE, 0.6 PART OF AZOBISISOBUTYRONITRILE AND 12.4 PARTS OF n-PENTANE

| Example | Reagent Added 1 Hour and 30–35 Minutes at 75° C. | | | | pH of Final Slurry | Bead Characteristics | | |
|---|---|---|---|---|---|---|---|---|
| | Class | Reagent | Concentration on Total Monomer | | | Color | Solubility in CHCl₃, 23° C. | Residual Acrylonitrile, Percent |
| | | | G. Moles per 100 G. | Weight, Percent | | | | |
| Ex. IV | Control | None | | | 7.4 | Yellow | Insoluble | 0.6 |
| | Alkali metal hydroxides | Sodium hydroxide | 0.0125 | 0.50 | 10.3 | White | Soluble | <0.1 |
| | | Potassium hydroxide | 0.0125 | 0.70 | 10.3 | ___do___ | ___do___ | 0.1 |
| | | Lithium hydroxide | 0.0125 | 0.30 | 10.5 | ___do___ | ___do___ | 0.1 |
| Ex. V | Quaternary ammonium hydroxides | Tetraethylammonium hydroxide | 0.0125 | 1.84 | 10.5 | ___do___ | ___do___ | 0.1 |
| Ex. VI | Hydroxides of multivalent metals | Calcium hydroxide | 0.0312 | 2.32 | 9.5 | ___do___ | ___do___ | 0.1 |
| | | ___do___ | 0.0125 | 1.15 | 9.2 | Cream | ___do___ | <0.1 |
| | | Barium hydroxide | 0.0125 | 2.14 | 9.4 | ___do___ | ___do___ | 0.2 |
| | | Magnesium oxide | 0.0063 | 0.26 | 9.9 | Yellow | Insoluble | 0.4 |
| | | ___do___ | 0.0312 | 1.26 | 10.5 | ___do___ | ___do___ | 0.4 |
| | | Aluminum hydroxide | 0.0043 | 0.34 | 7.3 | ___do___ | ___do___ | 0.4 |
| | | ___do___ | 0.021 | 1.68 | 7.4 | ___do___ | ___do___ | 0.5 |
| Ex. VII | Basic salts | Sodium acetate (acid pK=4.8) | 0.0625 | 8.50 | 7.7 | ___do___ | ___do___ | 0.4 |
| | | Sodium bicarbonate (acid pK=6.4) | 0.0125 | 1.05 | 9.1 | ___do___ | ___do___ | 0.6 |
| | | Dibasic sodium phosphate (acid pK=7.2) | 0.0125 | 1.77 | 8.8 | ___do___ | ___do___ | 0.5 |
| | | Sodium tetraborate (acid pK=9.1) | 0.0125 | 4.76 | 9.2 | ___do___ | ___do___ | 0.7 |
| | | Sodium carbonate (acid pK=10.3) | 0.0063 | 0.65 | 10.1 | ___do___ | ___do___ | 0.4 |
| | | | 0.0307 | 3.26 | 10.3 | ___do___ | ___do___ | 0.3 |
| | | Sodium aluminate (acid pK=12.2) | 0.0125 | 1.03 | | White | Soluble | 0.1 |
| | | | 0.0625 | 5.12 | 11.5 | ___do___ | ___do___ | 0.1 |
| | | Sodium metasilicate (acid pK=12.0) | 0.0125 | 1.5 | 10.7 | ___do___ | ___do___ | 0.1 |
| | | | 0.0625 | 7.6 | 11.0 | Off White | ___do___ | 0.1 |
| | | Trisodium phosphate (acid pK=12.7) | 0.0063 | 1.03 | 10.4 | Light Yellow | ___do___ | 0.1 |
| | | | 0.0125 | 2.05 | 11.0 | Off White | ___do___ | 0.1 |
| Ex. VIII | Ammonia and amines | Ammonia (aqueous) | 0.0125 | 0.22 | 7.5 | Yellow | Insoluble | |
| | | ___do___ | 0.0625 | 1.06 | 7.9 | ___do___ | ___do___ | 0.4 |
| | | Morpholine | 0.0125 | 1.08 | 10.2 | Light Yellow | ___do___ | 0.6 |
| | | Monoethanolamine | 0.0125 | 0.76 | 9.9 | Yellow | ___do___ | 0.4 |
| | | Dicyandiamide | 0.0043 | 0.36 | 7.4 | ___do___ | ___do___ | |
| | | ___do___ | 0.0209 | 1.76 | 7.4 | ___do___ | ___do___ | |
| Ex. IX | Acids | Thioglycollic acid | 0.0125 | 1.16 | 4.6 | White | ___do___ | 0.4 |
| | | ___do___ | 0.0625 | 5.76 | 3.8 | ___do___ | Soluble | 0.6 |
| | | Lactic acid | 0.0625 | 5.64 | | Cream | Insoluble | 0.4 |
| | | Acetic acid | 0.0625 | 3.76 | | ___do___ | ___do___ | 0.5 |
| | | ortho-Phosphoric acid | 0.0625 | 6.12 | 2.4 | One yellow lump | | |
| | | Sulfuric acid | 0.0125 | 1.22 | 3.1 | ___do___ | | |
| Ex. X | Water-soluble peroxides | Ammonium persulfate | 0.0125 | 2.86 | 4.3 | ___do___ | | |
| | | ___do___ | 0.0250 | 5.72 | 2.2 | ___do___ | | |
| | | Hydrogen peroxide | 0.0125 | 0.44 | 6.0 | Off White | Insoluble | 0.5 |
| Ex. XI | Oxidizing agents | Sodium hypochlorite | 0.0125 | 0.92 | 7.8 | Yellow | ___do___ | |
| | | Sodium chromate | 0.0125 | 2.00 | 9.6 | ___do___ | ___do___ | |
| | | Sodium chlorate | 0.0125 | 1.34 | 7.4 | ___do___ | ___do___ | 0.5 |
| | | ___do___ | 0.0625 | 6.6 | 7.5 | ___do___ | ___do___ | |
| Ex. XII | Various other reagents | Sodium bisulfite | 0.0125 | 1.30 | 7.2 | ___do___ | ___do___ | 0.7 |
| | | Formaldehyde | 0.0125 | 1.88 | 7.3 | Light Yellow | ___do___ | |
| | | Ethanol | 0.0625 | 2.88 | 7.3 | Yellow | ___do___ | |
| | | Isopropanol | 0.0625 | 3.78 | 7.3 | ___do___ | ___do___ | |
| | | Propylene glycol | 0.0625 | 4.76 | 6.9 | ___do___ | ___do___ | |

EXAMPLE XIII

The procedure of Example IV was followed with the exception that the percent of acrylonitrile monomer was varied. The results obtained compared to an untreated standard containing an equal amount of acrylonitrile are shown in Table II below.

EXAMPLE XIV

To a 5-gallon Pfaudler reactor was added the following formulation:

Formulation: Parts
- Styrene _____ 55
- Acrylonitrile _____ 35
- Alpha-methylstyrene _____ 10
- Lauroyl peroxide _____ 0.8
- Benzoyl peroxide _____ 0.2
- Water _____ 300
- Tricalcium phosphate _____ 3.0
- Alkylphenylpolyoxyethylene ether _____ 0.06

Sodium hydroxide, 1.0 part as a ten percent aqueous solution, was added to the reactants at various intervals after the beads had submerged. The results are shown below.

| Run No. | Time of Addition, Hrs. | Color of Beads |
|---|---|---|
| A | 1.25 | Deep yellow. |
| B | 1.0 | Yellow. |
| C | 0.5 | Slight yellow. |
| D | 0.4 | Clear, nearly colorless. |

The beads were converted to injection molded grade pellets by the extrusion-chopping method. The pellets of run No. D were pale straw in color and gave moldings of similar color. Beads which were not treated with caustic or where the addition of caustic had been further delayed gave moldings which were brown in color.

Table II

EFFECT OF MONOMER COMPOSITION AND ADDITIVES ON EXPANDABLE STYRENE-ACRYLONITRILE COPOLYMER BEADS

| Percent AN in Feed | NaOH, percent | Time, Hrs. | Final pH | Bead Characteristics | | | Foam Properties, Percent Original Volume Retained | |
|---|---|---|---|---|---|---|---|---|
| | | | | Color | Percent AN | Percent Residual AN | Aromatic Gasoline (Amoco) | 30/70 Toluene Iso-octane |
| 20 | | | 7.4 | White | 18.5 | 0.1 | <10 | |
| 20 | 0.5 | 1.75 | 10.4 | ...do... | 13.5 | <0.1 | | |
| 25 | | | 7.3 | Light Yellow | 23.8 | 0.2 | 10 | |
| 25 | 0.5 | 1.75 | 10.2 | White | 15.9 | <0.1 | | |
| 30 | | | 7.4 | Yellow | 27.6 | 0.3 | 100 | |
| 30 | 0.5 | 1.75 | 10.4 | White | 21.2 | <0.1 | 7 | |
| 35 | | | 7.4 | Yellow | 32.0 | 0.4 | 100 | |
| 35 | 0.5 | 1.6 | 10.4 | White | 28.2 | <0.1 | 100 | |
| 35 | 0.6 | 1.6 | 10.4 | ...do... | 28.4 | <0.1 | 100 | 100 |
| 35 | 1.0 | 1.5 | 10.6 | ...do... | 25.8 | 0.1 | 44 | 15 |
| 35 | 0.6 | 1.9 | 11.6 | Light Yellow | 31.1 | 0.1 | 100 | 100 |
| 37.5 | 1.0 | 1.5 | | Off White | 28.8 | 0.1 | 90 | 93 |
| 40 | 1.0 | 1.5 | | Cream | 30.6 | <0.1 | 99 | 100 |

We claim:

1. A method of making acrylonitrile-containing polymeric beads which are substantially free of residual acrylonitrile and discoloration comprising the steps of:
   (1) polymerizing at a temperature of 65–100° C. a monomeric mixture comprising 60–75 percent by weight of vinyl aryl monomer and 25–40 percent by weight of acrylonitrile in an aqueous suspension in the presence of a catalytic amount of a free radical initiator until the polymerization has progressed to about the bead identity point;
   (2) adding a base selected from the group consisting of:
      (a) alkali metal hydroxide and oxide;
      (b) alkaline earth metal hydroxide and oxide wherein said alkaline earth metal has an atomic number of 20–56 inclusive;
      (c) tetraalkyl quaternary ammonium compounds wherein said alkyl group is a member selected from the group consisting of methyl, ethyl, and n-propyl; and
      (d) alkali metal salts of weak acids having a pK of at least 12.0;
   said base being added in an amount sufficient to maintain said beads in a colorless condition;
   (3) thereafter completing said polymerization; and
   (4) recovering said polymeric beads.

2. A method of making acrylonitrile-containing polymeric beads which are substantially free of residual acrylonitrile and discoloration comprising the steps of:
   (1) polymerizing at a temperature of 65–100° C. a monomeric mixture comprising 60–75 percent by weight of vinyl aryl monomer and 25–40 percent by weight of acrylonitrile in an aqueous suspension in the presence of a low boiling hydrocarbon and a catalytic amount of a free radical initiator until the polymerization has progressed to about the bead identity point;
   (2) adding a base selected from the group consisting of:
      (a) alkali metal hydroxide and oxide;
      (b) alkaline earth metal hydroxide and oxide wherein said alkaline earth metal has an atomic number of 20–56 inclusive;
      (c) tetraalkyl quaternary ammonium compounds wherein said alkyl group is a member selected from the group consisting of methyl, ethyl, and n-propyl; and
      (d) alkali metal salts of weak acids having a pK of at least 12.0;
   said base being added in an amount sufficient to maintain said beads in a colorless condition;
   (3) thereafter completing said polymerization; and
   (4) recovering the polymer as beads, said beads being expandable on the application of heat.

3. A method of making acrylonitrile-containing expandable polymeric beads which are substantially free of residual acrylonitrile and discoloration comprising the steps of:
   (1) polymerizing at a temperature of 65–100° C. a monomeric mixture comprising 60–75 percent by weight of vinyl aryl monomer and 25–40 percent by weight of acrylonitrile in an aqueous suspension in the presence of a low boiling hydrocarbon and a catalytic amount of a free radical initiator until about 75–85 percent of said monomeric mixture has been polymerized;
   (2) adding 0.03–0.15 gram moles per 100 grams of acrylonitrile of a base selected from the group consisting of:
      (a) alkali metal hydroxide and oxide;
      (b) alkaline earth metal hydroxide and oxide wherein said alkaline earth metal has an atomic number of 20–56 inclusive;
      (c) tetraalkyl quaternary ammonium compounds wherein said alkyl group is a member selected from the group consisting of methyl, ethyl, and n-propyl; and
      (d) alkali metal salts of weak acids having a pK of at least 12.0;
   (3) thereafter completing said polymerization; and
   (4) recovering said polymer as beads, said beads being expandable on the application of heat.

4. A method according to claim 3, wherein said base is alkali metal hydroxide.

5. A method according to claim 3, wherein said base is alkaline earth metal hydroxide wherein said alkaline earth metal has an atomic number of 20–56 inclusive.

6. A method according to claim 3, wherein said base is tetraalkyl ammonium compound wherein said alkyl group is a member selected from the group consisting of methyl, ethyl and n-propyl.

7. A method according to claim 3, wherein said base is alkali metal salt of a weak acid having a pK of at least 12.0.

8. A method of making aromatic gasoline resistant styrene-acrylonitrile polymeric beads which are substantially free of residual acrylonitrile and discoloration comprising polymerizing 60–75 percent by weight of styrene with 40–25 percent by weight of acryonitrile in an aqueous suspension at a temperature of 65–100° C. in the presence of a catalytic amount of a free radical initiator until about 75–85 percent of said monomer mixture has been polymerized; adding 0.03–0.15 gram moles per 100 grams of acrylonitrile of alkali metal hydroxide; completing the polymerization; and recovering said polymeric beads.

9. A method according to claim 8 wherein said monomeric mixture is polymerized in the presence of a low boiling hydrocarbon.

References Cited by the Examiner

UNITED STATES PATENTS 3,192,169  6/1965  Doak _____ 260—2.5

MURRAY TILLMAN, *Primary Examiner.*

M. FOELAK, *Assistant Examiner.*